United States Patent [19]

Kamiji et al.

[11] Patent Number: 5,429,385
[45] Date of Patent: Jul. 4, 1995

[54] AIR BAG DEVICE FOR PASSENGER SEAT

[75] Inventors: Koichi Kamiji; Minoru Kanda, both of Wako, Japan

[73] Assignee: Honda Giken Kogyo Kabushiki Kaisha, Tokyo, Japan

[21] Appl. No.: 115,007

[22] Filed: Sep. 1, 1993

[30] Foreign Application Priority Data

Sep. 2, 1992 [JP] Japan .................................. 4-067615

[51] Int. Cl.⁶ .............................................. B60R 21/16
[52] U.S. Cl. .................................. 280/728.3; 280/732
[58] Field of Search ................ 280/728 B, 732, 743 R

[56] References Cited

U.S. PATENT DOCUMENTS 5,035,444 7/1991 Carter .................................. 280/732
5,234,227 8/1993 Webber ............................... 280/732
5,242,192 9/1993 Prescaro et al. .................... 280/732
5,292,151 3/1994 Parker ................................. 280/732

*Primary Examiner*—Kenneth R. Rice
*Attorney, Agent, or Firm*—Armstrong, Westerman, Hattori, McLeland & Naughton

[57] ABSTRACT

An air bag device for use in front of a passenger seat of an automobile includes a casing disposed in the instrument panel of the automobile, a folded air bag housed in the casing and inflatable through the upper opening upon impact, and a lid openably joined to the casing in covering relationship to the upper opening. An air bag restraint guide or protective cloth is joined to the casing for preventing the air bag from directly contacting an edge of the upper opening when the air bag is inflated through the upper opening.

13 Claims, 6 Drawing Sheets

AIR BAG DEVICE FOR PASSENGER SEAT

BACKGROUND OF THE INVENTION

1. Field of the Invention

The present invention relates to an air bag device for use in front of a passenger seat.

2. Description of the Related Art

Air bag devices are widely used on automobiles for protecting drivers against collision-induced damage. Recently, more and more automobiles incorporate air bag devices positioned in front of passenger seats as well as driver seats to meet demands for greater safety of drivers and passengers in case of collisions.

An air bag device for use in front of a passenger seat is stored in an instrument panel behind a front windshield in front of the passenger seat. Specifically, the air bag device is placed in an opening defined in the instrument panel, and has an upper lid lying flush with an upper surface of the instrument panel.

Upon impact, the air bag is rapidly inflated through the opening in the instrument panel toward the occupant on the passenger seat while pushing the lid upwardly.

When the air bag is inflated through the opening in the instrument panel, the air bag is prevented by the lid from being inflated toward the front windshield. The opening in the instrument panel has an edge facing the passenger compartment. The edge of the opening, however, tends to interfere with the air bag as it is inflated, causing the inflated air bag to damage the surface of the instrument panel.

SUMMARY OF THE INVENTION

It is therefore an object of the present invention to provide an air bag device for use in front of a passenger seat, which allows an air bag to be inflated out of interference with an edge of an opening defined in an instrument panel in which the air bag is stored, so that the air bag can smoothly be inflated from the opening without damaging the surface of the instrument panel.

According to the present invention, there is provided an air bag device for use in front of a passenger seat of an automobile having an instrument panel, comprising a casing adapted to be disposed in the instrument panel, the casing having an upper opening, a folded air bag housed in the casing and inflatable through the upper opening upon impact, a lid openably joined to the casing in covering relationship to the upper opening, and means joined to the casing for preventing the air bag from directly contacting an edge of the upper opening when the air bag is inflated through the upper opening.

The means may comprise a restraint guide fastened to a panel of the casing near a passenger compartment of the automobile, for guiding the air bag out of contact with the edge of the upper opening when the air bag is inflated.

Alternatively, the means may comprise a protective cloth fastened to a panel of the casing near a passenger compartment of the automobile, for keeping the air bag out of contact with the edge of the upper opening when the air bag is inflated.

According to the present invention, there is also provided an air bag device for use in front of a passenger seat of an automobile having an instrument panel, comprising a casing adapted to be disposed in the instrument panel, the casing having an upper opening, a folded air bag housed in the casing and inflatable through the upper opening upon impact, a lid openably joined to the casing in covering relationship to the upper opening, and an air bag restraint guide joined to the casing and forcibly bendable by the air bag into a position between the air bag and an edge of the upper opening near a passenger compartment of the automobile when the air bag is inflated, for guiding the air bag out of direct interfere with an edge of the upper opening when the air bag is inflated through the upper opening.

According to the present invention, there is further provided an air bag device for use in front of a passenger seat of an automobile having an instrument panel, comprising a casing adapted to be disposed in the instrument panel, the casing having an upper opening, a folded air bag housed in the casing and inflatable through the upper opening upon impact, a lid openably joined to the casing in covering relationship to the upper opening, and a protective cloth joined to the casing and forcibly flexible by the air bag into a position between the air bag and an edge of the upper opening near a passenger compartment of the automobile when the air bag is inflated, for keeping the air bag out of direct interfere with an edge of the upper opening when the air bag is inflated through the upper opening.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
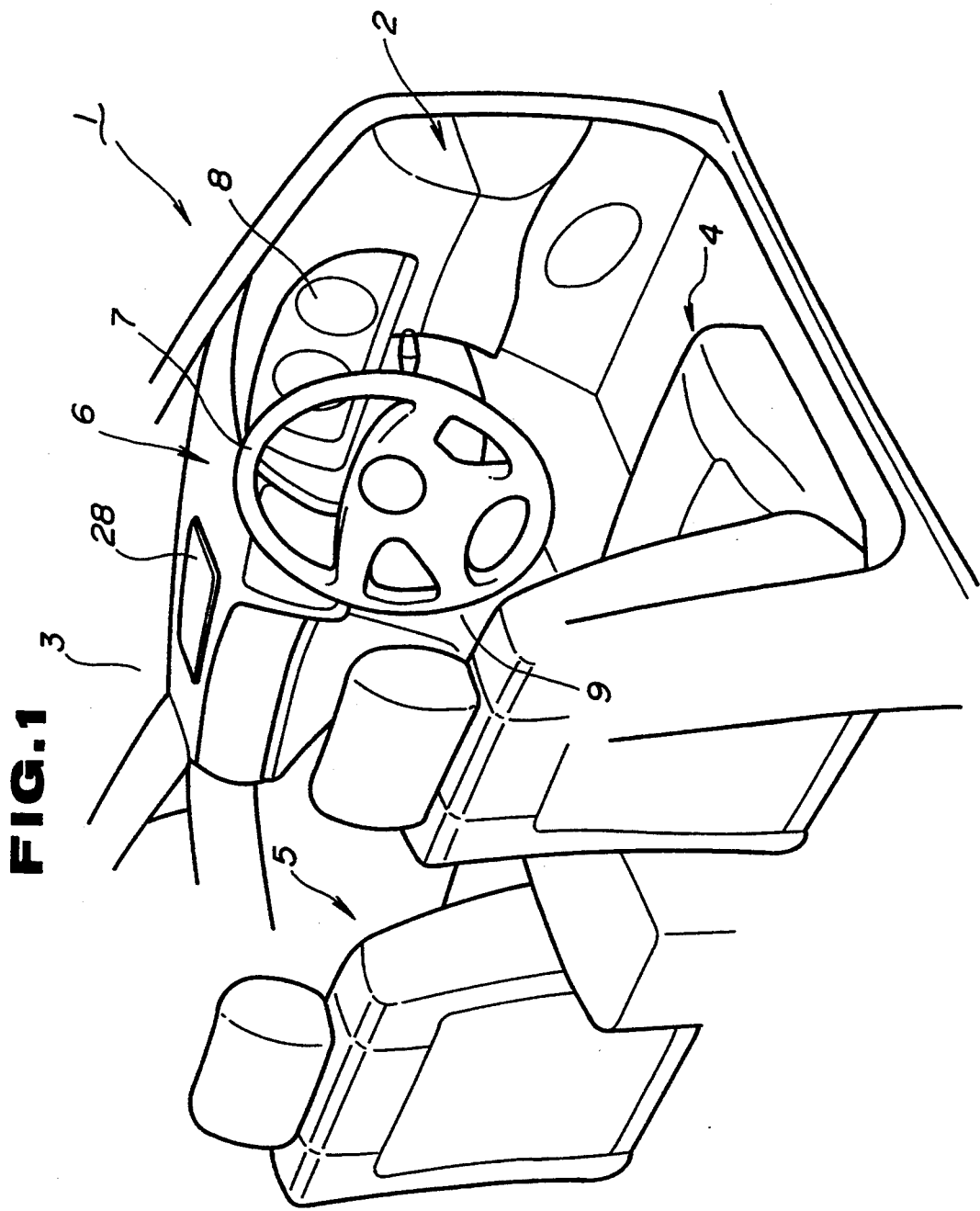
FIG. 1 is a fragmentary perspective view of an automobile, showing front seats as driver and passenger seats.

As shown in FIG. 1, an automobile 1 includes a front windshield 3 positioned in front of front seats 2 including driver and passenger seats 4, 5.

The automobile 1 also has an instrument panel 6 positioned in front of the front seats 2 and extending fully across the automobile, a steering wheel 7 positioned in front of the driver seat 4, a plurality of meters 8 on a region of the instrument panel 6 in front of the steering wheel 7, and a center console 9 located between the driver and passenger seats 4, 5.

An air bag device (not shown) associated with the driver seat 4 is disposed centrally in the steering wheel 7, and an air bag device 15 (see FIGS. 2 and 3) associated with the passenger seat 5 is disposed in a region of the instrument panel 6 in front of the passenger seat 5.

Figure 2:
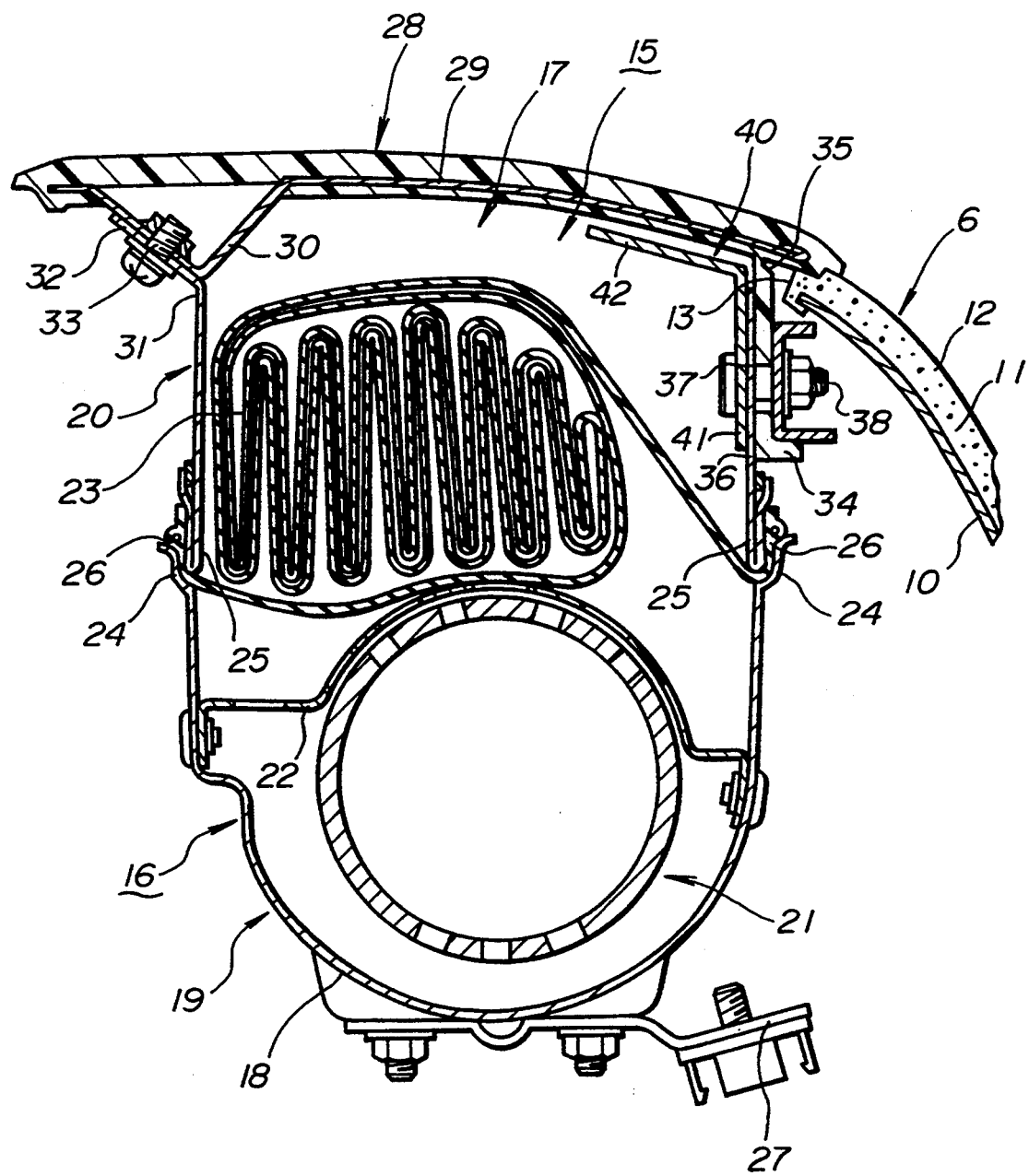
FIG. 2 is a vertical cross-sectional view of an air bag device according to an embodiment of the present invention, the air bag device being mounted in an instrument panel.
Figure 3:
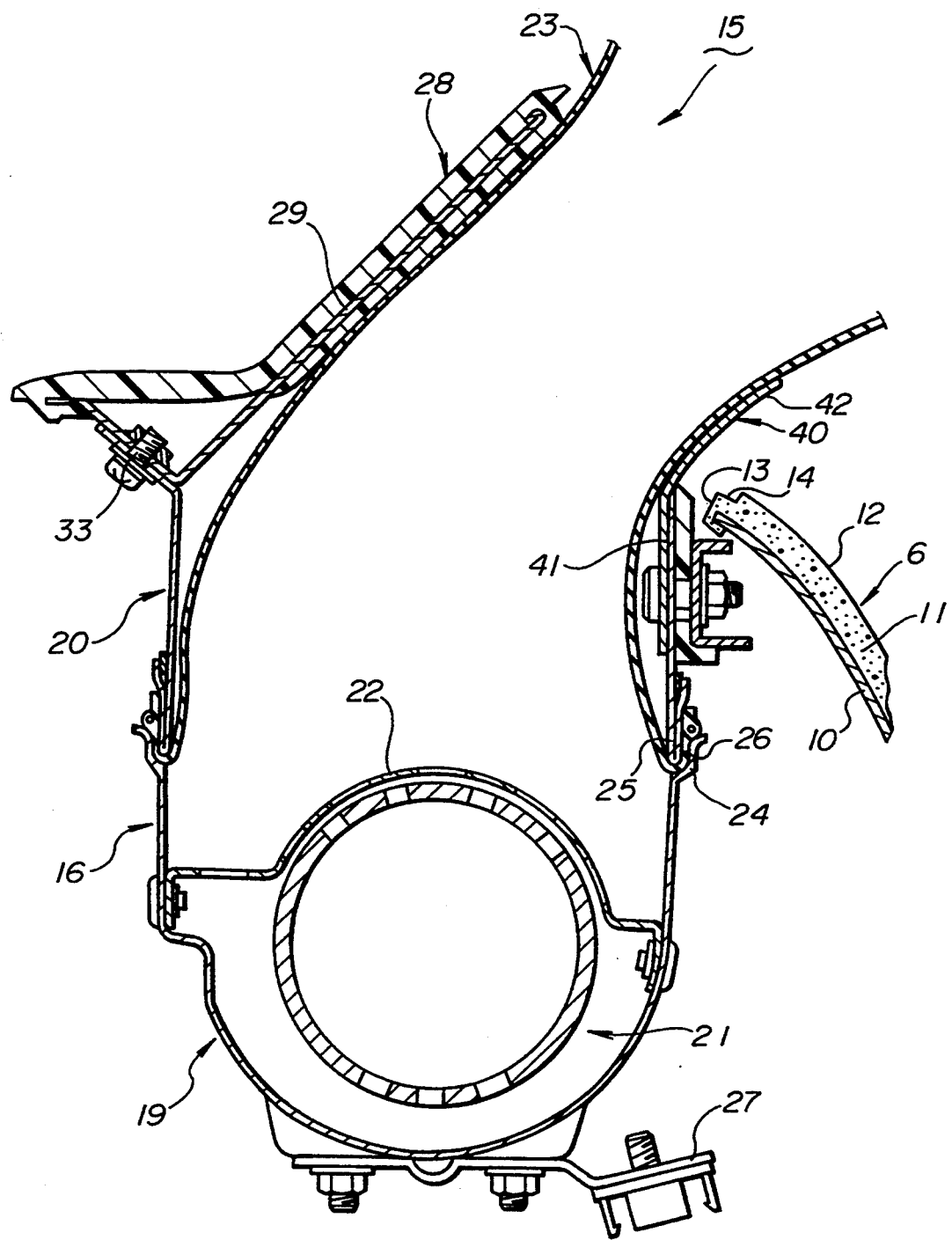
FIG. 3 is a vertical cross-sectional view of the air bag device shown in FIG. 2, illustrating an air bag as being inflated.

As shown in FIGS. 2 and 3, the instrument panel 6 comprises a baseboard 10 made of hard resin or the like, a cushioning layer 11 applied to a surface of the instrument panel 6 which faces the driver and passenger seats 4, 5, and a ornamental covering sheet 12 covering the cushioning layer 11.

The instrument panel 6 has a laterally elongate opening 13 defined in an upper surface thereof in front of the passenger seat 5, the opening 13 having a step 14 (see FIG. 3) along its edge. The air bag device 15 is stored in the instrument panel 6 through the opening 13.

As shown in FIG. 2, the air bag device 15 includes a laterally elongate casing 16 having an upper opening 17 and comprising a lower case 19 having a bottom panel 18 and a frame-like upper case 20 in which the opening 19 is defined. The lower and upper cases 19, 20 are removably fastened to each other.

The lower case 19 houses therein an inflator 21 whose upper surface is supported by a stay 22 extending across the lower case 19. An air bag 23 which is folded is stored in the lower and upper cases 19, 20 above the stay 22.

The lower case 19 has an outwardly bent engaging edge 24 along its upper peripheral edge portion, and the upper case 20 has a lower edge 25 fitted in the engaging edge 24. The air bag 23 has a peripheral edge 26 clamped between the lower edge 25 of the upper case 20 and the engaging edge 24 of the lower case 19, and is folded and stored in the casing 16.

A stay 27 is fastened to the bottom panel 18 of the lower case 19, and also coupled to a stay or the like (not shown) joined to the instrument panel 6. Thus, the air bag device 15 is supported by the instrument panel 6.

A lid 28 (see also FIG. 1) is disposed over the upper opening 17 of the casing 16. The lid 28 is made of the same resin as that of the instrument panel 6, and has its outer edge fitted in the step 14 of the opening 13.

A core plate 29 is embedded in the lid 28 at a transversely intermediate position therein and has a V-shaped rear portion 30 projecting out of the lid 28. The projecting rear end portion 30 is fastened by a bolt 33 to a support 32 bent rearwardly from an upper edge of a vertical rear panel 31 of the upper case 20.

A front support flap 34 projects downwardly along an inner edge of the opening 13 in the instrument panel 6. The front support flap 34 has a recess 35 defined in an upper edge thereof which is joined to a lower surface of the lid 28, the recess 35 extending in the forward direction of the automobile. The portion of the front support flap 34 below the recess 35 is fastened to an upper portion 37 of a front vertical panel 36 of the upper case 20 by a bolt 38.

The upper edge of the front support flap 34 with the recess 35 serves as a tear-off region which will be forcibly cut off when the air bag 23 is inflated, allowing the air bag 23 to be inflated through the opening 13 toward the passenger seat 5.

The air bag device 15 includes an air bag restraint guide 40 positioned in the opening 13 of the casing 16 along its edge near the passenger compartment of the automobile.

The air bag restraint guide 40 is disposed directly below the lid 28 in a region of the casing 16 near the passenger compartment of the automobile. The air bag restraint guide 40 is substantially inverted V-shaped as viewed in side elevation. The air bag restraint guide 40 comprises a substantially vertical base 41 which is also fastened to the upper portion 37 of the front vertical panel 36 by the bolt 38, and an overhanging member 42 bent substantially at a right angle from an upper edge of the base 41 toward the front windshield and positioned substantially at the same height as the opening 13.

The air bag 23 that is stored in the casing 16 has a portion located below the overhanging member 42.

The air bag restraint guide 40 is in the form of a thin plate made of a resin material such as a thermoplastic elastomer, polypropylene, urethane, or the like, or aluminum alloy, or iron.

When the air bag 23 is inflated, the overhanging member 42 is easily bent upwardly by the air bag 23, and is positioned between the edge of the opening 13 and the inflated air bag 23.

The air bag device 15 operates as follows: When the automobile collides with another automobile or object, the inflator 21 is actuated upon impact to inflate the air bag 23. The tear-off region including the recess 35 by which the lid 28 is joined to the casing 16 is forcibly cut off, and the lid 28 is lifted by the inflating air bag 23 with the front edge of the lid 28 remaining joined to the casing 16. While lifting the lid 28, the air bag 23 is expanded through the openings 17, 13 into the passenger compartment.

At this time, the overhanging member 42 of the air bag restraint guide 40 is forcibly bent upwardly and toward the passenger compartment by contact with the air bag 23 as it is inflated, and is interposed between the edge of the opening 13 near the passenger compartment and the inflating air bag 23, as shown in FIG. 3.

Figure 4:
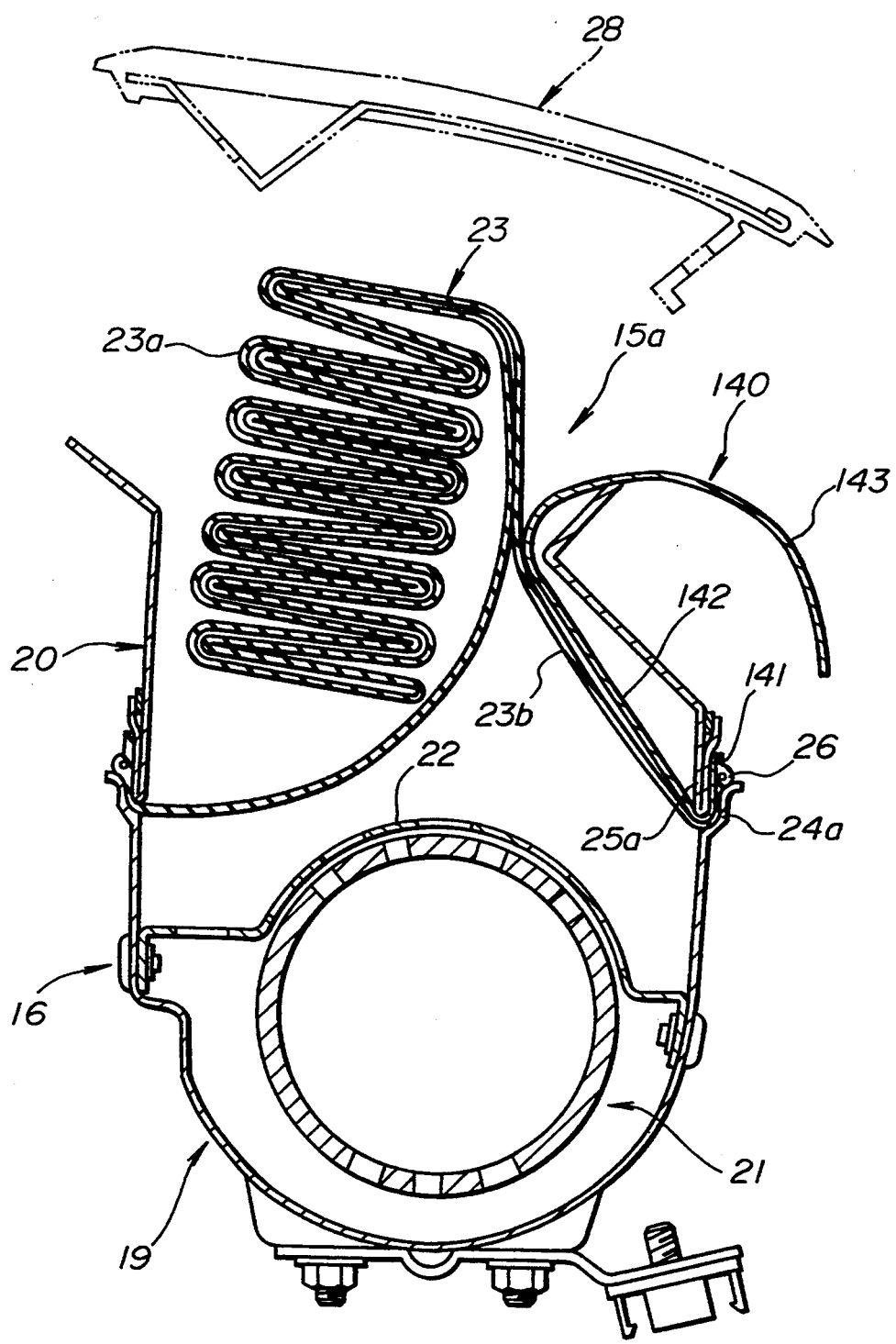
FIG. 4 is a vertical cross-sectional view of an air bag device according to another embodiment of the present invention, the air bag device including a protective cloth, with a lid not attached.
Figure 5:
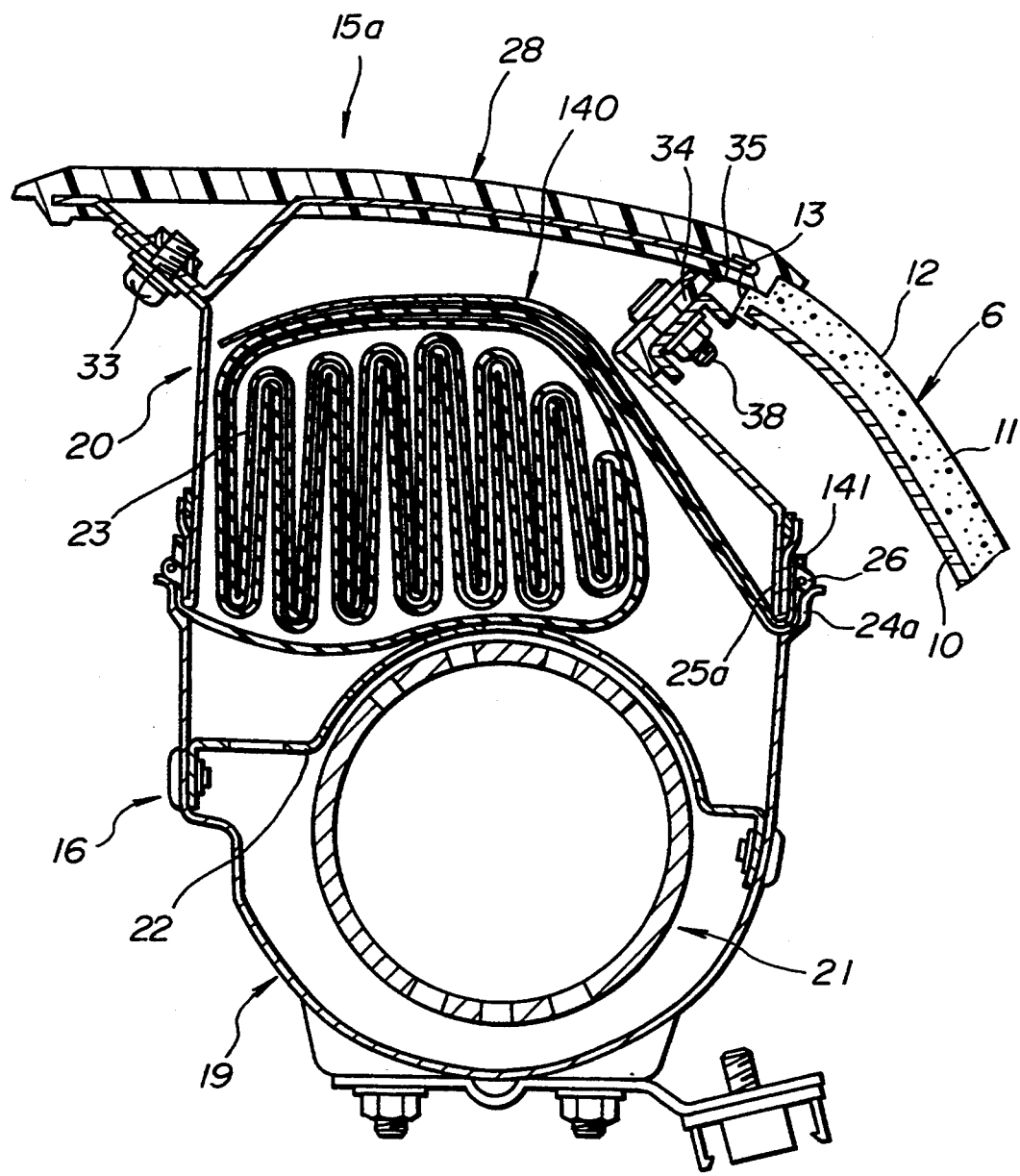
FIG. 5 is a vertical cross-sectional view of the air bag device shown in FIG. 4 which is mounted in an instrument panel.
Figure 6:
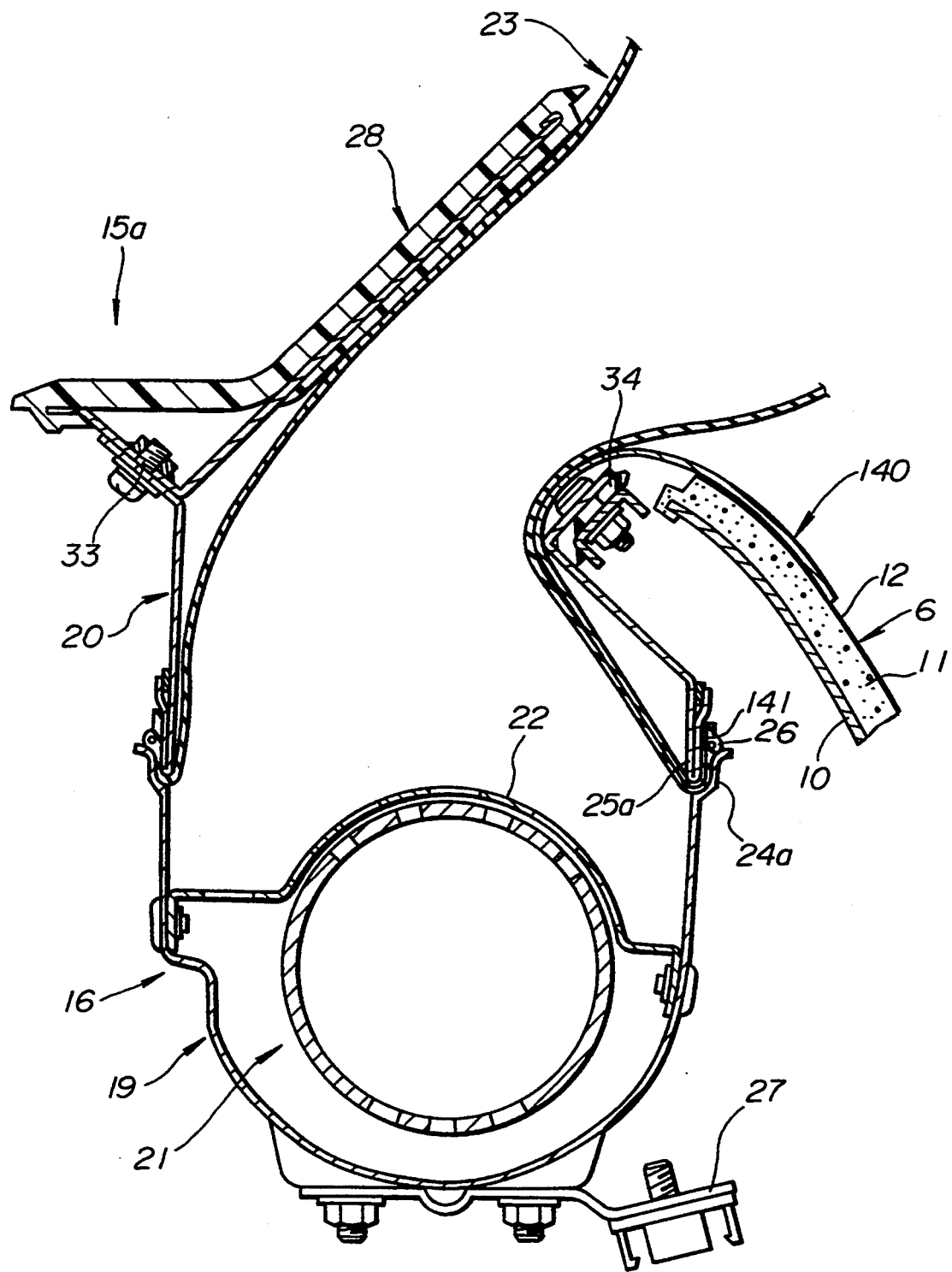
FIG. 6 is a vertical cross-sectional view of the air bag device shown in FIG. 4, illustrating an air bag as being inflated.

FIGS. 4 through 6 show an air bag device according to another embodiment of the present invention. The air bag device 15 shown in FIGS. 4 through 6 employs a protective cloth 140, which may be either woven or nonwoven, in place of the air bag restraint guide 40 shown in FIGS. 2 and 3.

The other structural details including the air bag 23, the inflator 21, the casing 16, the lid 28, etc. are identical to those of the air bag device 15 shown in FIGS. 2 and 3, and will not be described in detail below.

FIG. 4 illustrates the air bag device 15 before the air bag 23 is set in the casing 16. The air bag 23 has its peripheral edge 26 clamped between the edges 24, 25 of the lower and upper cases 19, 20. The protective cloth 140 has a lower edge 141 clamped between portions 24a, 25a of the edges 24, 25 near the passenger compartment.

The air bag 23 has an intermediate portion 23a folded into a vertical array of layers, and is placed downwardly into an upper portion of the casing 16 through the opening 15. The protective cloth 140 has a rear portion 142 placed on a lower portion of the air bag 23 near the passenger compartment, and a front portion 143 bent angularly from the rear portion 142 over the upper case 20 and hanging downwardly into the passenger compartment.

The air bag 23 is turned clockwise 90° from the position shown in FIG. 3 into the position shown in FIG. 4, stored in the casing 16, covered with the protective cloth 140, and the lid 28 is joined to the casing 16 over the opening 13. The air bag 23 is now mounted in the instrument panel 6 as shown in FIG. 4.

When the automobile collides with another automobile or object, the inflator 21 is actuated upon impact to inflate the air bag 23. The tear-off region including the recess 35 is forcibly cut off, and the lid 28 is lifted by the inflating air bag 23 with the front edge of the lid 28 remaining joined to the casing 16. While lifting the lid 28, the air bag 23 is expanded through the openings 17, 13 into the passenger compartment.

At this time, the protective cloth 140 is forcibly flexed upwardly and toward the passenger compartment by contact with the air bag 23 as it is inflated, and is interposed between the edge of the opening 13 near the passenger compartment and the inflating air bag 23, as shown in FIG. 6.

As described above, when the air bag 23 is inflated, since the air bag restraint guide 40 or the protective cloth 140 is deformed or flexed and positioned between the surface of the air bag 23 and the edge of the opening 13, the air bag 23 is prevented from interfering directly with the edge of the opening 13 and hence can smoothly be inflated through the opening 13. Therefore, the instrument panel 6 is prevented from being damaged by direct contact with the air bag 23 when it is inflated.

The air bag device 15 is relatively simple in structure as it additionally requires only the air bag restraint guide 40 or the protective cloth 140. The air bag device 15 is relatively inexpensive as it can reliably prevent the air bag 23 from interfering with the edge of the opening 13 with a minimum number of parts.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An air bag device for use in front of a passenger seat of an automobile having an instrument panel, comprising:
   a casing adapted to be disposed in the instrument panel, said casing having an upper opening:
   a folded air bag housed in said casing and inflatable through said upper opening upon impact;
   a lid openably joined to said casing in covering relationship to said upper opening;
   said lid being attached at a front end thereof to the instrument panel through a member which is tearable by the pressure of the air bag alone when inflated such that inflation of said air bag creates sufficient force to tear said member and enable said lid to open;
   means joined to a front side of said casing for preventing said air bag from directly contacting an front edge of said upper opening at said front side, closest to the passenger, when said air bag is inflated so as to extend through said upper opening;
   said means comprising a restraint guide fastened at a fixed position to a front panel of said casing nearest to the passenger for guiding the air bag out of contact with said front edge of said opening when the air bag is inflated; and
   said restraint guide comprises a base fastened to said panel of said casing and an overhanging member bent from said base into said upper opening.

2. An air bag device according to claim 1, wherein said restraint guide is in the form of a thin plate which is positioned between said front edge and said air bag and is forcibly bent upwardly over said front edge and towards the front side by the air bag during inflation such as to be interposed between said front edge and said air bag when inflated.

3. An air bag device according to claim 2, wherein said restraint guide is made from a resin material.

4. An air bag device according to claim 2, wherein said restraint guide is made from a metal material.

5. An air bag device for use in front of a passenger seat of an automobile having an instrument panel, comprising:
   a casing adapted to be disposed in the instrument panel, said casing having an upper opening;
   a folded air bag housed in said casing and inflatable through said upper opening upon impact;
   a lid openably joined to said casing in covering relationship to said upper opening;
   said lid being attached at a front end thereof to the instrument panel through a member which is tearable by the pressure of the air bag alone when inflated such that inflation of said air bag creates sufficient force to tear said member and enable said lid to open;
   means joined to a front side of said casing for preventing said air bag from directly contacting an front edge of said upper opening at said front side, closest to the passenger, when said air bag is inflated so as to extend through said upper opening;
   wherein said means comprises a only a single front protective cloth fastened to a front panel of said casing at a front side thereof, nearest the passenger, for keeping the air bag out of contact with said front edge of said upper opening when the air bag is inflated;
   said protective cloth being positioned between said front edge and said air bag, and being forcibly bent around towards the front side by the air bag during inflation such as to be interposed between the front edge and said air bag when inflated.

6. An air bag device according to claim 5, wherein said protective cloth is placed over said air bag in said casing before said air bag is inflated.

7. An air bag device for use in front of a passenger seat of an automobile having an instrument panel, comprising:
   a casing adapted to be disposed in the instrument panel, said casing having an upper opening;
   a folded air bag housed in said casing and inflatable through said upper opening upon impact;
   a lid openably joined to said casing in covering relationship to said upper opening;
   said lid being attached at a front end thereof to the instrument panel through a member which is tearable by the pressure of the air bag alone when inflated such that inflation of said air bag creates sufficient force to tear said member and enable said lid to open;
   an air bag restraint guide joined to said casing at a fixed position at a front side thereof and forcibly bendable by said air bag into a position between said air bag and a front edge of the upper opening, nearest a passenger, when the air bag is inflated, for guiding said air bag out of direct interference with said front edge of said upper opening when said air bag is inflated so as to extend through said upper opening.

8. An air bag device according to claim 7, wherein said air bag restraint guide comprises is base fastened to said panel of the casing and an overhanging member bent from said base into said upper opening.

9. An air bag device for use in front of a passenger seat of an automobile having an instrument panel behind a front windshield, comprising:
- a casing adapted to be disposed in the instrument panel, said casing having an upper opening;
- a folded air bag housed in said casing and inflatable through said upper opening upon impact;
- a lid openably joined to said casing in covering relationship to said upper opening; and
- a lid having a hinge portion on a front windshield side thereof so as to be one-sided openable with respect to said upper opening; and
- a sheet-like member joined to a front side of said casing and capable of being easily bendable more than 180°, upon inflation of said air bag, to be interposed between a front edge of said upper opening and said air bag for preventing said air bag from directly contacting said front edge of said upper opening when said air bag is inflated through said upper opening.

10. An air bag device according to claim 9, wherein said sheet-like member comprises a restraint guide fastened to a panel of said casing near a passenger compartment of the automobile, for guiding the air bag out of contact with said edge of said upper opening when the air bag is inflated.

11. An air bag device according to claim 10, wherein said restraint guide comprises a base fastened to said panel of the casing and an overhanging member bent from said base into said upper opening.

12. An air bag device according to claim 9, wherein said sheet-like member comprises a protective cloth fastened to a panel of said casing near a passenger compartment of the automobile, for keeping the air bag out of contact with said edge of said upper opening when the air bag is inflated.

13. An air bag device according to claim 12, wherein said protective cloth is placed over said air bag in said casing before said air bag is inflated.

* * * * *